United States Patent
Okihara et al.

(10) Patent No.: US 12,514,676 B2
(45) Date of Patent: Jan. 6, 2026

(54) MEDICAL IMAGE GUIDANCE MARKER

(71) Applicant: Kyoto Prefectural Public University Corporation, Kyoto (JP)

(72) Inventors: Koji Okihara, Kyoto (JP); Osamu Ukimura, Kyoto (JP)

(73) Assignee: Kyoto Prefectural Public University Corporation, Kyoto (JP)

( * ) Notice: Subject to any disclaimer, the term of this patent is extended or adjusted under 35 U.S.C. 154(b) by 745 days.

(21) Appl. No.: 17/625,895

(22) PCT Filed: Jun. 11, 2020

(86) PCT No.: PCT/JP2020/023063
§ 371 (c)(1),
(2) Date: Jun. 24, 2022

(87) PCT Pub. No.: WO2021/005955
PCT Pub. Date: Jan. 14, 2021

(65) Prior Publication Data
US 2022/0354615 A1    Nov. 10, 2022

(30) Foreign Application Priority Data
Jul. 10, 2019  (JP) ................................ 2019-128620

(51) Int. Cl.
*A61B 90/00*    (2016.01)
(52) U.S. Cl.
CPC ...... *A61B 90/39* (2016.02); *A61B 2090/3954* (2016.02); *A61B 2090/3966* (2016.02)

(58) Field of Classification Search
CPC ............ A61B 90/39; A61B 2090/3954; A61B 2090/3966; A61B 2090/3995
See application file for complete search history.

(56) References Cited

U.S. PATENT DOCUMENTS

| | | | |
|---|---|---|---|
| 6,544,231 B1 * | 4/2003 | Palmer ................. | A61B 17/221 604/165.01 |
| 7,087,077 B1 | 8/2006 | Van Dijk et al. | |
| 10,220,120 B2 | 3/2019 | Shima et al. | |

(Continued)

FOREIGN PATENT DOCUMENTS

| | | |
|---|---|---|
| JP | 2009-502321 A | 1/2009 |
| JP | 4523179 B2 | 8/2010 |

(Continued)

OTHER PUBLICATIONS

Kodama et al.; "Preparation of an Au—Pt alloy free from artifacts in magnetic resonance imaging"; Magnetic Resonance Imaging vol. 44, Dec. 2017, pp. 38-45 (Year: 2017).*

*Primary Examiner* — Dixomara Vargas
(74) *Attorney, Agent, or Firm* — DLA Piper LLP (US)

(57) ABSTRACT

A medical image guidance marker to be placed in a biological tissue for tomographic image guidance, wherein the medical image guidance marker is made of an alloy with a magnetic susceptibility of −13 ppm to −5 ppm and has a shape of a coil, the coil is formed of a wire with a wire diameter of not less than 0.15 mm and not more than 0.45 mm and has a coil diameter of not less than 0.55 mm and not more than 1.20 mm, and the pitch of the coil is not less than 0.3 mm and not more than 1.5 mm and is not less than 1.8 times and not more than 4 times the wire diameter.

9 Claims, 5 Drawing Sheets

Marker A    Marker B    Marker C    Marker D

(56) References Cited

U.S. PATENT DOCUMENTS

| | | |
|---|---|---|
| 10,883,162 B2 | 1/2021 | Shima et al. |
| 2007/0023424 A1 | 2/2007 | Weber |
| 2007/0162108 A1* | 7/2007 | Carlson ................. A61M 25/09 623/901 |
| 2009/0069836 A1 | 3/2009 | Labdag et al. |
| 2009/0191087 A1* | 7/2009 | Klein ........................ C22C 5/04 420/463 |
| 2011/0040357 A1* | 2/2011 | Arai ..................... A61N 5/0601 359/599 |
| 2012/0035632 A1 | 2/2012 | Hamada et al. |
| 2012/0095545 A1* | 4/2012 | Yamagata ................. A61F 2/88 623/1.22 |
| 2014/0058257 A1* | 2/2014 | Stigall ............... A61M 25/0108 600/431 |
| 2016/0058382 A1 | 3/2016 | Burkett et al. |
| 2016/0354178 A1 | 12/2016 | Mayes et al. |
| 2017/0029927 A1 | 2/2017 | Shima et al. |
| 2019/0030215 A1 | 1/2019 | Okubo et al. |
| 2021/0153970 A1* | 5/2021 | Agostinelli ............. A61B 90/39 |
| 2022/0354615 A1* | 11/2022 | Okihara ................... A61B 8/00 |

FOREIGN PATENT DOCUMENTS

| | | | |
|---|---|---|---|
| JP | 2010-536491 A | 12/2010 | |
| JP | 2013-106829 A | 6/2013 | |
| JP | 5550027 B1 | 7/2014 | |
| JP | 5582484 B1 | 9/2014 | |
| JP | 2015-120946 A | 7/2015 | |
| JP | 2017-158608 A | 9/2017 | |
| JP | 2018-526160 A | 9/2018 | |
| WO | WO-2006119645 A1 * | 11/2006 | ............. A61B 5/055 |
| WO | 2007/070544 A2 | 6/2007 | |
| WO | 2010/084948 A1 | 7/2010 | |

* cited by examiner

Marker E    Marker D    Marker F

Marker E    Marker D    Marker F

MEDICAL IMAGE GUIDANCE MARKER

TECHNICAL FIELD

This disclosure relates to a medical image guidance marker.

BACKGROUND

Cancer therapy performed under the guidance of an imaging modality such as magnetic resonance imaging (MRI), ultrasound, or CT is now in widespread use. Even when cancer cannot be identified merely depending on the depictability of the cancer in an organ on images themselves, another technology is also available that allows recording of locations subjected to needle biopsy or the like as spatial coordinates. When the location of the cancer lesion is identified with reference to images or the presence of cancer is found through needle biopsy, the three-dimensional positional information of the cancer lesion can be grasped easily by placing, in a spatial location where the cancer lesion is present, an implantable marker that can be visualized using various types of imaging modalities. In particular, MRI and ultrasound are imaging technologies that do not at all involve radiation exposure, unlike CT. Accordingly, they can be used repeatedly for a long period of time and thus are of great utility to provide image guidance. In addition, MRI and ultrasound imaging technologies have made dramatic advances and, for example, concerning prostate cancer imaging technologies, MRI and ultrasound offer features that CT does not have. There have been many reports that fusion of MRI and ultrasound contributes to the improvement in diagnostic accuracy. There are quite a few situations where it is clinically necessary to use them in combination, more specifically, to use them respectively or in combination for different purposes like diagnosis and guidance while utilizing the advantages of the respective technologies. However, MRI and ultrasound are disadvantageous in that, when an implantable marker is used in imaging, artifacts are liable to occur owing to the presence of the marker, resulting in degraded imaging accuracy. An artifact refers to a phenomenon in which, in a magnetic field environment of MRI and the like, image distortion is caused owing to the difference in magnetic susceptibility between a metal object and a biological tissue around the metal object in the magnetic field. In ultrasonography, an artifact refers to an acoustic shadow and the like. Depending on the degree of the occurrence of artifacts, accurate surgery or accurate diagnosis may be hindered by the artifacts.

The material of the above-described implantable marker needs to have properties required for materials for medical use such as biocompatibility, corrosion resistance, and workability. Examples of metal materials that meet the above requirements and have been in practical use include stainless steel, Co—Cr alloys, and Pt—W alloys (see JP 2010-536491 A, for example). However, the above-described medical materials that have actually been in practical use are not able to suppress the occurrence of artifacts, because these medical materials have magnetic susceptibilities that differ greatly from those of biological tissues. On this account, as alloys aiming at artifact-free imaging, alloys of Au and Pd and alloys of Au and Pt have been proposed (see Japanese Patent Nos. 4523179, 5550027 and 5582484, for example). However, although these alloys exhibit a certain degree of effect on the occurrence of artifacts in a magnetic field environment, they cannot sufficiently suppress the occurrence of artifacts in ultrasonography and the like.

It could therefore be helpful to provide a medical image guidance marker to be placed in a biological tissue for tomographic image guidance, adapted to be applicable to at least all three types of tomographic imaging modalities, namely, MRI, ultrasound, and CT, and to minimize the occurrence of artifacts.

SUMMARY

We thus provide a medical image guidance marker to be placed in a biological tissue for tomographic image guidance, wherein the medical image guidance marker is made of an alloy with a magnetic susceptibility in the range from −13 ppm to −5 ppm and has a shape of a coil, the coil is formed of a wire with a wire diameter of not less than 0.15 mm and not more than 0.45 mm and has a coil diameter of not less than 0.55 mm and not more than 1.20 mm, and the pitch of the coil is not less than 0.3 mm and not more than 1.5 mm and is not less than 1.8 times and not more than 4 times the wire diameter.

The medical image guidance marker is preferably such that the coil has a coil length of not less than 6 mm and not more than 7 mm.

The medical image guidance marker is preferably such that the alloy with a magnetic susceptibility in the range from −13 ppm to −5 ppm is an Au—Pt alloy.

The medical image guidance marker is preferably such that the Au—Pt alloy contains Pt at a concentration of not less than 34 mass % and not more than 36 mass % with the balance being Au, and the Au—Pt alloy has a single-phase a structure in which the ratio (X/Y) of the peak intensity (X) of Pt (111) planes to the peak intensity (Y) of Au (111) planes is 0.01 or less in an X-ray diffraction analysis.

Alternatively, the medical image guidance marker is preferably such that the Au—Pt alloy contains Pt at a concentration of not less than 24 mass % and less than 34 mass % with the balance being Au, the Au—Pt alloy has at least a material structure in which a Pt-rich phase having a higher Pt concentration than an α phase is distributed in an α-phase matrix, the Pt concentration in the Pt-rich phase is 1.2 to 3.8 times higher than the Pt concentration in the α phase, and the area ratio of the Pt-rich phase is 1% to 22% in any cross section.

We provide a medical image guidance marker to be placed in a biological tissue for tomographic image guidance, adapted to be applicable to at least all three types of tomographic imaging modalities, namely, MRI, ultrasound, and CT, and to minimize the occurrence of artifacts. The medical image guidance marker can be particularly suitably used for image-guided therapy for prostate cancer.

REFERENCE SIGNS LIST

100: Medical image guidance marker
d: Wire diameter
D: Coil diameter
L: Coil length
p: Pitch

DETAILED DESCRIPTION

The medical image guidance marker will be described with reference to Examples. However, this disclosure is by no means limited to or restricted by the following Examples.

Figure 1:
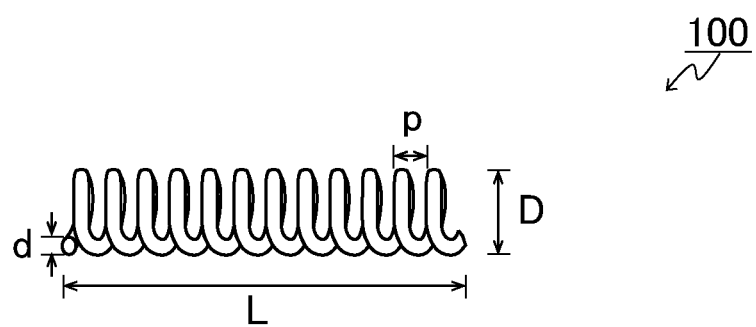
FIG. 1 is a diagram schematically showing a medical image guidance marker.

FIG. 1 is a diagram schematically showing a medical image guidance marker. A medical image guidance marker 100 has a shape of a coil. The essence of this disclosure is characterized in that it defines the material of the marker and also defines the shape of the coil (the wire diameter d, the coil diameter D, and the pitch p).

The medical image guidance marker is made of an alloy with a magnetic susceptibility of −13 ppm to −5 ppm. To suppress the occurrence of artifacts, it is important that the magnetic susceptibility (volume magnetic susceptibility) of the material approximate the magnetic susceptibility of a biological tissue. This does not mean that the magnetic susceptibility of the material should be simply lowered. The magnetic susceptibility of a biological tissue is determined mainly depending on the magnetic susceptibility of water as its main component. The magnetic susceptibility of water is −9 ppm. We enable the reduction of artifacts by using, as the material of the medical image guidance marker, an alloy with a magnetic susceptibility of +4 ppm relative to the magnetic susceptibility of water, i.e., an alloy with a magnetic susceptibility of −13 ppm to −5 ppm. The term "magnetic susceptibility" means the volume magnetic susceptibility measured using a superconducting quantum interference device (SQUID) system (7T-SQUID fluxmeter manufactured by Quantum Design Japan, Inc.) at a measurement temperature of 37° C.

However, we found that the occurrence of artifacts cannot be suppressed sufficiently merely by optimizing the material, and the degree of the occurrence of artifacts also varies depending on the shape of the marker. We found that the degree of the occurrence of artifacts differ between when a marker has a solid rod shape and when a marker has a hollow coil shape that is formed by winding a thin wire, even though their outer shapes are both cylindrical. Further, we found that the pitch p of the coil (turn-to-turn spacing) also affects the occurrence of artifacts. Based on these findings, we succeeded in providing a medical image guidance marker to be placed in a body, adapted to be applicable to at least all three types of imaging modalities, namely, MRI, ultrasound, and CT, and to minimize the occurrence of artifacts.

The shape of the medical image guidance marker is specifically as follows: a wire made of a material with a magnetic susceptibility in the above-described range and having a wire diameter d of not less than 0.15 mm and not more than 0.45 mm is formed into a shape of a coil having a coil diameter D of not less than 0.55 mm and not more than 1.20 mm and a pitch p of not less than 0.3 mm and not more than 1.5 mm, and the pitch p is not less than 1.8 times and not more than 4 times the wire diameter d of the wire. The pitch p is preferably not less than 2 times and not more than 3.5 times the wire diameter d, and more preferably not less than 2 times and not more than 3 times the wire diameter d. The wire diameter d is preferably not less than 20% and not more than 40% of the coil diameter D. When the medical image guidance marker is used for, for example, the prostate, the shape of the medical image guidance marker is preferably as follows: a wire having a wire diameter d of not less than 0.2 mm and not more than 0.3 mm is formed into a shape of a coil having a coil diameter D of not less than 0.6 mm and not more than 1.0 mm and a pitch p of not less than 0.5 mm and not more than 0.8 mm.

In conventionally used coil-shaped markers, a coil shape is formed by winding a wire such that adjacent wire turns are in close contact with each other with no gap being formed between adjacent wire turns. In other words, the pitch p of the coil is substantially equal to the wire diameter d of the wire. In contrast, in the medical image guidance marker, the pitch p is set to be larger than the wire diameter d, thereby providing a gap between adjacent wire turns of the coil. As will be described below, it was found that, even if the wire is formed of the same material, the occurrence of artifacts (acoustic shadows) in ultrasound images can be suppressed when adjacent wire turns are provided to be spaced apart from each other rather than being in close contact with each other. The pitch p of the coil is particularly preferably not less than 0.6 mm and not more than 0.7 mm.

The coil length L can be selected as appropriate depending on an organ in which the medical image guidance marker is to be implanted. In particular, when the medical image guidance marker is used for the prostate, the coil length L is preferably not less than 6 mm and not more than 7 mm. When the marker is used for the prostate, owing to the nature of the tissue around a site to place the marker, the marker may move in the tissue if the length thereof is too short. On this account, the coil length L is preferably not less than 6 mm and not more than 7 mm from the viewpoint of achieving the positional stability. Examples of an organ in which the marker is to be implanted include the prostate, lung, liver, gallbladder, kidney, pancreas, and breast. The marker is readily available for the prostate.

The alloy with a magnetic susceptibility of −13 ppm to −5 ppm is preferably an Au—Pt alloy. An Au—Pt alloy is a suitable material in terms of capability of allowing artifact-free imaging by MRI. Since gold (Au) alone is too soft to be formed into a predetermined coil shape, an Au—Pt alloy containing a proper amount of Pt is preferable also from the viewpoint of handleability.

The Au—Pt alloy is preferably an alloy disclosed in Japanese Patent No. 5550027, namely, an alloy that contains Pt at a concentration of not less than 34 mass % and not more than 36 mass % with the balance being Au and has a single-phase a structure in which the ratio (X/Y) of the peak intensity (X) of Pt (111) planes to the peak intensity (Y) of Au (111) planes is 0.01 or less in an X-ray diffraction analysis.

Alternatively, the Au—Pt alloy is preferably an alloy disclosed in Japanese Patent No. 5582484, namely, an alloy that contains Pt at a concentration of not less than 24 mass % and less than 34 mass % with the balance being Au and has at least a material structure in which a Pt-rich phase having a higher Pt concentration than an α phase is distributed in an α-phase matrix, the Pt concentration in the Pt-rich phase is 1.2 to 3.8 times higher than the Pt concentration in the α phase, and the area ratio of the Pt-rich phase is 1% to 22% in any cross-section.

Such Au—Pt alloys are favorable in terms of properties required for alloys for medical use such as biocompatibility, corrosion resistance, and workability, and also have a magnetic susceptibility suitable for use as a material aiming at artifact-free imaging. As described above concerning a coil shape, the occurrence of artifacts (acoustic shadows) is reduced by providing a gap between adjacent wire turns. This, on the other hand, reduces the physical strength derived from the shape. However, since a marker formed using an alloy made of a material containing platinum can have an increased strength as compared with, for example, a coil-shaped marker made of Au alone, the marker can have a sufficient strength even when the marker is in the above-described desired shape.

Several types of markers for external-beam radiotherapy have been put on the market, and they are all made of gold (Au). These markers are placed in a body for the purpose of acquiring positional information in pre-treatment CT imaging, and they are placed in a peripheral portion of a cancer lesion, for example. The reason for this is that, if the markers are placed in a central portion of the cancer lesion, the cancer lesion cannot be observed owing to artifacts caused by the markers. In contrast, our medical image guidance marker eliminates the necessity of considering the influence of artifacts. Accordingly, it can be placed in a central portion of a cancer lesion and can be used to directly observe treatment progress or to specify a target site for treatment. Although the target site for treatment also can be specified using conventional markers, it is necessary to place them in several sites around the cancer lesion and identify the positional relationship between each marker and the cancer lesion. Accordingly, multiple punctures are required to place the markers. In contrast, our medical image guidance marker may be placed directly at a target site. Since the medical image guidance marker need only be placed at one site, the medical image guidance marker is also advantageous in that the number of punctures can be reduced, whereby the burden on a patient can be alleviated.

Our medical image guidance marker has a shape that smoothly passes through a 16- to 20-gauge puncture needle for image guidance. The surface of the medical image guidance marker can maintain a smooth state when the surface of an alloy wire having undergone a wire-drawing process is used as it is. When the surface of the medical image guidance marker is in this state, the insertion resistance at the time of puncture insertion of the marker into a body can be reduced as much as possible. Alternatively, fine irregularities may be provided on the surface of the medical image guidance marker by subjecting the surface of an alloy wire before being formed into a coil shape or the surface of a coil obtained after coil processing of the alloy wire to shot peening, sand blasting or the like. When the surface of the medical image guidance marker is in this state, the insertion resistance at the time of puncture insertion of the marker increases. However, this can bring about an anchoring effect to prevent unintended movement of the medical image guidance marker within a tissue after the marker is placed in a body. Moreover, in a B-mode (tomographic) ultrasound image, the fine irregularities provided on the surface increase diffuse reflection of echoes, thereby enabling improved visualization. As described above, the medical image guidance marker, which is in the form of a coil with a gap being provided between adjacent wire turns, can suppress the occurrence of acoustic shadows to the lowest possible level. Accordingly, it can serve as an indispensable marker when performing a puncture procedure under the guidance of ultrasound imaging while using DICOM data of MRI images, which are becoming more and more widespread in clinical practice, in combination.

The medical image guidance marker is applicable not only to external-beam radiotherapy but also to targeted therapy that targets a cancer lesion such as active surveillance. Further, in conventional external-beam radiotherapy for prostate cancer using X-rays or particle rays, the medical image guidance marker can also be used for the purpose of position adjustment using a cone-beam CT system.

EXAMPLES

CT Images

Figure 2:
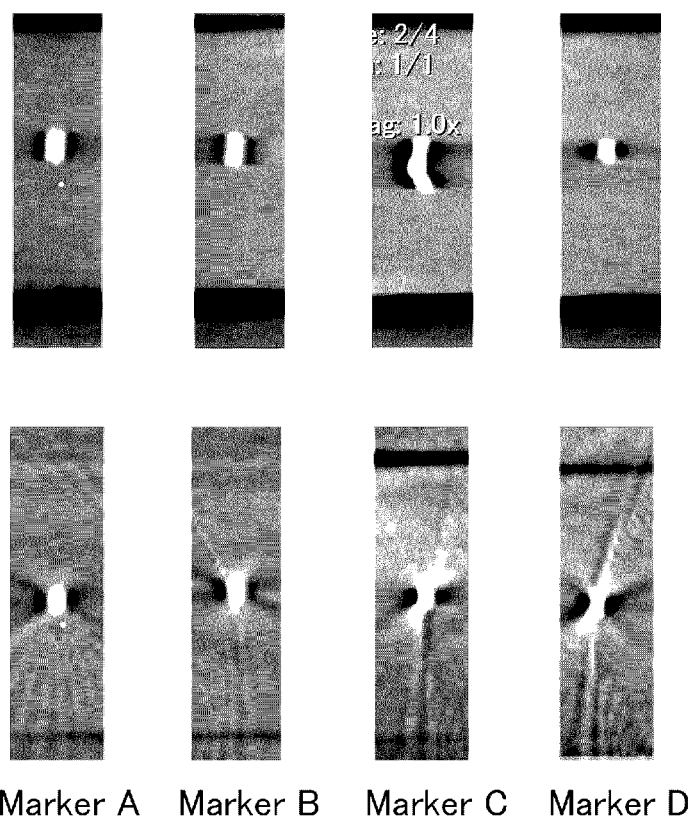
FIG. 2 shows CT images of our medical image guidance markers and conventional markers. The upper row shows longitudinal sections, and the lower row shows transverse sections.

FIG. 2 shows CT images of our medical image guidance markers (Examples) and conventional markers (Comparative Examples). The upper row shows longitudinal sections, and the lower row shows transverse sections. Marker A and Marker B are our medical image guidance markers. Marker C and Marker D are conventional markers (products available on the market) made of gold (Au). These markers are as described below.

Example 1: Marker A

Marker A was made of an Au-30 Pt alloy. Marker A had a wire diameter of 0.2 mm, a coil diameter D of 0.8 mm, and a coil pitch p of 0.6 mm.

Example 2: Marker B

Marker B was made of an Au-30 Pt alloy. Marker B had a wire diameter of 0.2 mm, a coil diameter D of 0.8 mm, and a coil pitch p of 0.7 mm.

Comparative Example 1: Marker C

"VISICOIL Marker (Pre-loaded)" VC-076-010-PL 0.75× 10 mm (manufactured by Sceti Medical Labo K. K.) was used as Marker C.

This marker is made of Au. The coil diameter D is 0.75 mm, and adjacent wire turns in this coil are in close contact with each other.

Comparative Example 2: Marker D

"ACCULOC gold marker" MTNW887872 18 G×20 cm 0.9× 3 mm (manufactured by CIVCO) was used as Marker D.

This marker is made of Au. The marker is a cylindrical marker having a diameter of 0.9 mm and a length of 3 mm.

The Au-30 Pt alloys used in Examples 1 and 2 and also in Example 3 to be described below were Au—Pt alloys having a Pt concentration of 30 mass % and having undergone a heat treatment at 800° C. for 24 hours according to the method described in Japanese Patent No. 5582484. The alloys in the production lot used in these Examples had a magnetic susceptibility of −7 ppm. The magnetic susceptibility of Au is −34 ppm.

In FIG. 2, black voids around the markers are artifacts. It can be seen from the CT images that the medical image guidance markers of Examples 1 and 2 caused almost no artifacts in both the longitudinal and transverse sections. In contrast, the markers of Comparative Examples 1 and 2 caused artifacts in both the longitudinal and transverse sections. The markers of the Comparative Examples may render the assessment based on images difficult owing to artifacts caused by placing these markers. On this account, the markers of the Comparative Examples are not placed in an area to be observed although they are sufficiently effective for the purpose of grasping positional information by placing them in a border region of the area to be observed. In contrast, the medical image guidance markers of Examples 1 and 2 minimized the occurrence of artifacts and thus can be placed in an area to be observed.

MRI Images

Figure 3:
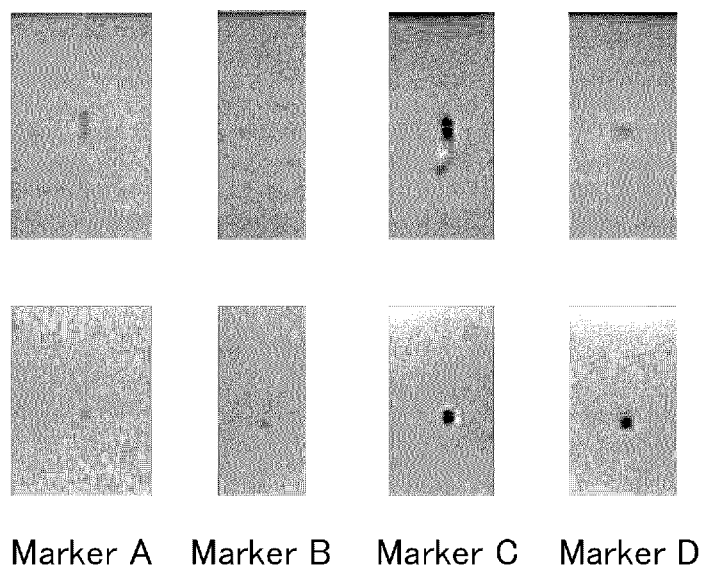
FIG. 3 shows the results of imaging of our medical image-guidance markers and conventional markers using an MRI system. The upper row shows longitudinal sections, and the lower row shows transverse sections.

FIG. 3 shows the results of imaging of the same markers as those shown in FIG. 2 using an MRI system. The upper row shows longitudinal sections, and the lower row shows transverse sections. Similarly to the results shown in FIG. 2, it can also be seen from the MRI images of FIG. 3 that the medical image guidance markers of Examples 1 and 2 caused almost no artifacts in both the longitudinal and transverse sections. In contrast, the markers of Comparative Examples 1 and 2 caused artifacts in both the longitudinal and transverse sections.

Ultrasound Images 1

Figure 4:
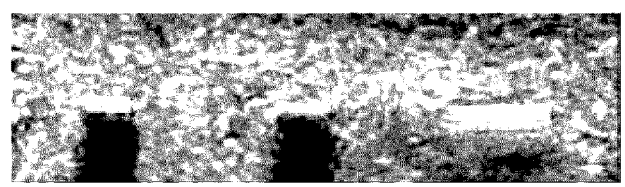
FIG. 4 shows ultrasound images of our medical image guidance marker and conventional markers. The upper row show ultrasound images with the markers being set horizontally, and the lower row shows ultrasound images with the markers being set at an inclination of about 40°.
Figure 4:
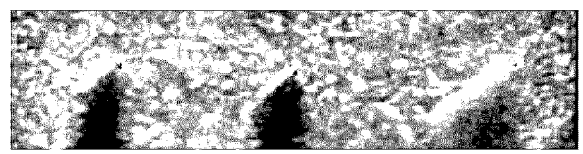

FIG. 4 shows ultrasound images of our medical image guidance marker (Example) and conventional markers (Comparative Examples). The upper row show ultrasound images with the markers being set horizontally, and the lower row shows ultrasound images with the markers being set obliquely at an inclination of about 40°. Marker F is our medical image guidance marker. Marker E is a conventional marker (a product available on the market) made of gold (Au). Marker D in FIG. 4 is the above-described marker of Comparative Example 2. The markers other than Marker D are as described below.

Example 3: Marker F

Marker F was made of an Au-30 Pt alloy. Marker F had a wire diameter d of 0.3 mm, a coil diameter D of 0.8 mm, and a coil pitch p of 0.6 mm.

Comparative Example 3: Marker E

"ACCULOC gold marker" (manufactured by CIVCO) was used as Marker E.

This marker is made of Au. The marker is a cylindrical marker having a diameter of 1.2 mm and a length of 3 mm.

It can be seen that the markers of Example 3 and Comparative Examples 2 and 3 were all clearly recognizable in the ultrasound images. In FIG. 4, black voids seen like shadows around the markers are acoustic shadows (artifacts). It can be seen that, when the medical image guidance marker of Example 3 was used, very little acoustic shadows were observed in both the ultrasound image with the marker being set horizontally and the ultrasound image with the marker being set obliquely. In contrast, it can be seen that, when the markers of Comparative Examples 2 and 3 were used, acoustic shadows were observed in a wide range in both the ultrasound images with the markers being set horizontally and the ultrasound images with the marker being set obliquely. Although the medical image guidance marker of the example shown in FIG. 4 is the one having a wire diameter d of 0.3 mm and a pitch p of 0.6 mm, similar results were obtained also when the wire diameter d of the medical image guidance marker was changed to 0.2 mm. Variations of the marker of the example were produced by changing the pitch p, and ultrasound images of these markers were examined. As a result, we found that, in the state where the marker was set horizontally, artifacts were further reduced when the pitch p was set to 0.6 mm or more. In the state where the marker was set obliquely, artifacts were further reduced when the pitch p was set in the range from 0.5 mm to 0.8 mm.

As markers of other Comparative Examples, two Au markers "Gold Anchor (trade name)" manufactured by Naslund Medical were provided. They are compatible with a 25-gauge needle, and one was 10 mm in length (Comparative Example 6, GA200-10) and the other was 20 mm in length (Comparative Example 7, GA200-20). Ultrasound images of these markers were examined. These markers have a linear shape before being placed in a body, but they are rounded when placed in a body, thereby turning into a small sphere (0.75 mm in diameter). It was extremely difficult to recognize the positional information of these markers in such a spherical state in the ultrasound images.

Ultrasound Images 2

Figure 5:
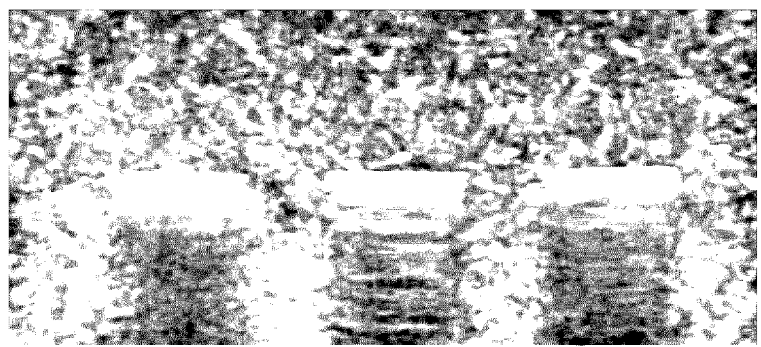
FIG. 5 shows ultrasound images of our medical image guidance markers and conventional markers (with the markers being set horizontally).

FIG. 5 shows ultrasound images of our medical image guidance marker (Example) and medical image guidance markers of Comparative Examples. FIG. 5 shows ultrasound images with the markers being set horizontally. Marker A, Marker G, and Marker H were all made of the same material (Au-30 Pt) and differed from each other in the wire diameter d and the pitch p. Marker A is the above-described marker of Example 1. The markers other than Marker A are as described below.

Comparative Example 4: Marker G

Marker G was made of an Au-30 Pt alloy. Marker G had a wire diameter of 0.2 mm and a coil diameter D of 0.8 mm. The coil pitch p was 0.2 mm, and adjacent wire turns in this coil were in close contact with each other.

Comparative Example 5: Marker H

Marker H was made of an Au-30 Pt alloy. Marker H had a wire diameter d of 0.3 mm and a coil diameter D of 0.8 mm. The coil pitch p was 0.3 mm, and adjacent wire turns in this coil were in close contact with each other.

The markers of Example 1 and Comparative Examples 4 and 5 were made of the same material. Accordingly, it can be seen that the difference in the degree of acoustic shadows was caused by the difference in the coil pitch p of these markers. When the adjacent wire turns of the coil were in close contact with each other (Comparative Examples 4 and 5), artifacts (portions with streak-like acoustic shadows) resulting from multiple echoes were observed at levels deeper than the markers. It can be seen that, by increasing the pitch p relative to the wire diameter d to provide a gap between adjacent wire turns of the coil as in Example 1 (Marker A), the occurrence of artifacts (acoustic shadows) in the ultrasound images was suppressed.

Animal Experiment

An animal experiment was performed using dogs. Dogs were selected for the experiment because the canine prostate is very similar to the human prostate and ultrasound-guided puncture for the canine prostate and the human prostate can be carried out in exactly the same manner. The details of the animals used in the experiment were as follows:
  Animal species: dog
  Breed: beagle
  Sex: male
  Age: 63 to 82 months
  Number of animals used: five dogs
  Weight range of dogs during experiment: 9.55 to 10.90 kg.

The following markers were used as medical image guidance markers.

Example 4: Coil Pitch P=0.7 mm

A medical image guidance marker of Example 4 was made of an Au-30 Pt alloy and had a wire diameter d of 0.3 mm, a coil diameter D of 0.8 mm, and a coil pitch p of 0.7 mm.

Example 5: Coil Pitch P=0.9 mm

A medical image guidance marker of Example 5 was made of an Au-30 Pt alloy and had a wire diameter d of 0.3 mm, a coil diameter D of 0.8 mm, and a coil pitch p of 0.9 mm.

The Au-30 Pt alloys used in Examples 4 and 5 were Au—Pt alloys having a Pt concentration of 30 mass % and having undergone a heat treatment at 800° C. for 24 hours according to the method described in Japanese Patent No. 5582484. The alloys in the production lot used in these examples had a magnetic susceptibility of −6.3 ppm.

Anesthesia

Each dog underwent induction of anesthesia with intravenous injection of 22.5 mg/kg of thiamylal sodium (the dose thereof was increased or decreased depending on the anesthetized state, 17 to 23 mg/kg). Thereafter, a tracheal cannula was inserted to the respiratory tract of the dog, and the dog was artificially ventilated using an animal ventilator manufactured by ACOMA Medical Industry Co., Ltd. The dog was then anesthetized by inhalation of a mixed gas (Air: $O_2$=3:0.2 as a general guideline) and 2.0% isoflurane (ISO-FLURANE Inhalation Solution "Pfizer" manufactured by Mylan Inc.).

Weight of Prostate

The weights of the prostates of the five dogs were as follows:

Dog 1: 29.4 g
Dog 2: 20.6 g
Dog 3: 14.7 g
Dog 4: 11.1 g
Dog 5: 17.1 g.

Placement of Markers

Our medical image guidance markers and conventional markers were placed in the right and left lobes of the prostate of each dog in a manner to be described below.

Dog 1

An attempt was made to place two markers of Example 4 (the coil pitch: 0.7 mm) in each lobe of the prostate. However, the two markers placed in the right lobe were in close proximity to each other. Thus, one additional marker was placed at a position apart from the above-described two markers. In the left lobe, two markers of Example 4 were placed, as originally intended.

Dog 2

Two markers of Example 5 (the coil pitch: 0.9 mm) were placed in each lobe of the prostate.

Dog 3

One marker of Example 4 (the coil pitch: 0.7 mm) and one marker of Example 5 (the coil pitch: 0.9 mm) were placed in the right lobe of the prostate. Two markers of Comparative Example 2 ("ACCULOC gold marker" MTNW887872 18 G×20 cm 0.9× 3 mm (manufactured by CIVCO)) were placed in the left lobe of the prostate.

Dog 4

One marker of Example 4 (the coil pitch: 0.7 mm) and one marker of Example 5 (the coil pitch: 0.9 mm) were placed in the right lobe of the prostate. Two markers of Comparative Example 1 ("VISICOIL Marker (pre-loaded)" VC-076-010-PL 0.75×10 mm (manufactured by Sceti Medical Labo K. K.) were placed in the left lobe of the prostate.

Dog 5

One marker of Example 4 (the coil pitch: 0.7 mm) and one marker of Example 5 (the coil pitch: 0.9 mm) were placed in the right lobe of the prostate. Two markers of Comparative Example 6 ("Gold Anchor" GA200-10 (manufactured by Naslund Medical)) were placed in the left lobe of the prostate.

Results of Ultrasonography

Dog 1

None of the five markers suffered from acoustic shadow interference.

Dog 2

None of the four markers suffered from acoustic shadow interference, and it seemed that the result of ultrasonography obtained did not differ from the result of ultrasonography obtained when the markers of Example 4 with a coil pitch of 0.7 mm were used.

Dog 3

In the left lobe of the prostate where the markers of Comparative Example 2 were placed, distinct acoustic shadows were observed on the markers.

Dog 4

The result of ultrasonography for the left lobe of the prostate where the markers of Comparative Example 1 were placed was equivalent to the result of ultrasonography obtained when the markers of Examples 4 and 5 were used in terms of the occurrence of acoustic shadows.

Dog 5

The markers of Comparative Example 6, which were placed in the left lobe of the prostate, were indefinitely localized (strong echoes indicating the pinpoint positions of the markers were not depicted, and high echo areas in a spherical shape were depicted).

Results of MRI Scan

The results of MRI scan were evaluated using a spin echo method. This is because T1 and T2 images depict needle tracts and hematomas around the needle tracts.

Dog 1 and Dog 2

When the markers of Example 4 and 5 were used, almost no artifacts were observed.

Dog 3, Dog 4, and Dog 5

When the markers of Comparative Examples 2 and 6 were used, distinct artifacts were depicted. When the markers of Comparative Example 1 were used, artifacts were observed although these artifacts were less pronounced than those observed when the markers of Comparative Examples 2 and 6 were used.

The results of the above-described animal experiment demonstrate that our medical image guidance marker exhibits good visibility after being placed and also causes no positional displacement after being placed. The results of the MRI scan demonstrate that, although the markers of the Comparative Examples caused pronounced artifacts even when a single one of them was placed in a target site, our medical image guidance markers caused no artifacts even when two or more of them were placed in different sites in a target organ.

Our medical image guidance marker enables more detailed observation or diagnosis in a less invasive manner, and this, in turn, further enables more precise therapy.

The invention claimed is:

1. A medical image guidance marker to be placed in a biological tissue for tomographic image guidance, wherein the medical image guidance marker comprises:
   a coil made of an alloy with a magnetic susceptibility of −13 ppm to −5 ppm,
   the coil is formed of a wire with a wire diameter of not less than 0.15 mm and not more than 0.45 mm and has a coil diameter of not less than 0.55 mm and not more than 1.20 mm, and
   the pitch of the coil is not less than 0.3 mm and not more than 1.5 mm and is not less than 1.8 times and not more than 4 times the wire diameter;
wherein the coil is configured such that adjacent wire turns are not in contact with each other and a gap is present between adjacent wire turns.

2. The medical image guidance marker according to claim 1, wherein the coil has a coil length of not less than 6 mm and not more than 7 mm.

3. The medical image guidance marker according to claim 1, wherein the alloy with a magnetic susceptibility of −13 ppm to −5 ppm is an Au—Pt alloy;
   wherein the Au—Pt alloy is a single-phase solid solution and is free of phase separation and segregation, as confirmed by X-ray diffraction and SEM-EDX analysis.

4. The medical image guidance marker according to claim 3, wherein
   the Au—Pt alloy contains Pt at a concentration of not less than 34 mass % and not more than 36 mass % with the balance being Au, and
   the Au—Pt alloy has a single-phase a structure in which a ratio (X/Y) of peak intensity (X) of Pt (111) planes to peak intensity (Y) of Au (111) planes is 0.01 or less in an X-ray diffraction analysis.

5. The medical image guidance marker according to claim 3, wherein
   the Au—Pt alloy contains Pt at a concentration of not less than 24 mass % and less than 34 mass % with the balance being Au,
   the Au—Pt alloy has at least a material structure in which a Pt-rich phase having a higher Pt concentration than an α phase is distributed in an α-phase matrix,
   the Pt concentration in the Pt-rich phase is 1.2 to 3.8 times higher than the Pt concentration in the α phase,
   an area ratio of the Pt-rich phase is 1% to 22% in any cross section; and
   the alloy has a volume magnetic susceptibility of −7 ppm to −9 ppm.

6. The medical image guidance marker according to claim 2, wherein the alloy with a magnetic susceptibility of −13 ppm to −5 ppm is an Au—Pt alloy.

7. The medical image guidance marker according to claim 6, wherein
   the Au—Pt alloy contains Pt at a concentration of not less than 34 mass % and not more than 36 mass % with the balance being Au,
   the Au—Pt alloy has a single-phase a structure in which a ratio (X/Y) of peak intensity (X) of Pt (111) planes to peak intensity (Y) of Au (111) planes is 0.01 or less in an X-ray diffraction analysis; and
   the alloy is free of dendritic or segregated microstructure.

8. The medical image guidance marker according to claim 6, wherein
   the Au—Pt alloy contains Pt at a concentration of not less than 24 mass % and less than 34 mass % with the balance being Au,
   the Au—Pt alloy has at least a material structure in which a Pt-rich phase having a higher Pt concentration than an α phase is distributed in an α phase matrix,
   the Pt concentration in the Pt-rich phase is 1.2 to 3.8 times higher than the Pt concentration in the α phase,
   an area ratio of the Pt rich phase is 1% to 22% in any cross section; and
   the alloy is processed to minimize phase separation and ensure homogeneity.

9. The medical image guidance marker according to claim 1, wherein the pitch of the coil is not more than 0.7 mm.

* * * * *